United States Patent [19]
Daggett et al.

[11] Patent Number: 4,980,838
[45] Date of Patent: Dec. 25, 1990

[54] DIGITAL ROBOT CONTROL HAVING PULSE WIDTH MODULATOR OPERABLE WITH REDUCED NOISE

[75] Inventors: Kenneth E. Daggett, Murrysville; Richard A. Johnson, Murrysville Boro; Leonard C. Vercellotti, Oakmont, all of Pa.; Richard J. Casler, Jr., Newtown, Conn.; Eimei M. Onaga, Pittsburgh; Lane L. Woodland, Ross Township, both of Pa.

[73] Assignee: Staubli International AG., Switzerland

[21] Appl. No.: 304,975

[22] Filed: Jan. 31, 1989

[51] Int. Cl.$^5$ .................................... G05B 19/42
[52] U.S. Cl. .......................... 318/568.16; 318/599; 901/23
[58] Field of Search .............. 364/513, 474.12; 318/599, 283, 284, 293, 294, 568.16, 568.11; 363/41, 63; 901/15, 23

[56] References Cited

U.S. PATENT DOCUMENTS

| | | | |
|---|---|---|---|
| 4,581,565 | 4/1986 | Van Pelt et al. | 318/294 |
| 4,600,983 | 7/1986 | Petsch | 318/599 |
| 4,710,686 | 12/1987 | Guzik | 318/599 |
| 4,786,847 | 11/1988 | Daggett et al. | 364/513 |

Primary Examiner—Allen R. MacDonald
Attorney, Agent, or Firm—Mason, Kolehmainen, Rathburn & Wyss

[57] ABSTRACT

A pulse width modulation (PWM) control circuit provides for improved implementation of position, velocity and current feedback loops for digital servo control of a multi axis robot. The PWM circuit utilizes a single resistor for sensing joint motor drive current. Circuitry is also disclosed for reducing audible noise and motor heating in large servo motors used for joint arms operated at relatively low PWM frequencies by reducing the motor ripple current.

8 Claims, 10 Drawing Sheets

DIGITAL ROBOT CONTROL HAVING PULSE WIDTH MODULATOR OPERABLE WITH REDUCED NOISE

CROSS-REFERENCE TO RELATED APPLICATIONS

The following copending patent applications are related to the disclosure of the present application, assigned to the present assignee and are hereby incorporated by reference:

W. E. Case 53,224, Ser. No. 932,975, filed Nov. 20, 1986, abandoned and continued as Application No. 180,719, filed on Apr. 4, 1988, entitled DIGITAL ROBOT CONTROL HAVING AN IMPROVED CURRENT SENSING SYSTEM FOR POWER AMPLIFIERS IN A DIGITAL ROBOT CONTROL, by Kenneth E. Daggett, Leonard C. Vercellotti, Richard A. Johnson, Richard J. Casler and Eimei Onaga, now U.S. Pat. No. 4,902,944.

W. E. Case 53,225, Ser. No. 932,841, filed Nov. 20, 1986, abandoned and continued as Application No. 231,627, filed on Aug. 5, 1988, entitled DIGITAL ROBO CONTROL HAVING AN IMPROVED PULSE WIDTH MODULATOR, by Kenneth E. Daggett, now U.S. Pat. No. 4,894,598.

BACKGROUND OF THE INVENTION

The present invention relates to robot controls and more particularly to pulse width modulators employable in digital robot controls to generate control signals for operating the power amplifiers and robot joint motors and thereby controlling the robot arm motion and positioning.

In the referenced patent applications, there is disclosed a digital robot control that provides improved robot operation and performance. In the digital robot control system, a pulse width modulator is employed to interface the digital control signals to conventional commercially available power packs or power amplifiers that drive the joint motors. The joint motor drive current, and thus the motor torque, is determined by amplifier cycle conduction time which is regulated by control pulse width. A single feedback resistor is used with the power pack to provide actual motor current signals for closed loop torque control.

As set forth in referenced W.E. 53,225, the pulse width modulator generally employs a cyclic ramp generator to generate output control pulses that produce amplifier conduction time corresponding to axis voltage commands and thus axis torque commands. For a zero voltage command, forced negative and positive end stop control voltages produce a ripple motor current that enables the regenerative motor current amplitude and polarity to be determined and thereby enables motor current feedback control with the use of economy hybrid power packs having a single power amplifier resistor in brushless and brush type DC motor embodiments.

At zero motor voltage command, any regenerative motor current is forced by switch action to flow through the current sense resistor on the power supply circuit. Although the sense resistor current is always in the same direction, the motor current direction (polarity) at any point in time is known because of the directing effect of the end control pulses on regenerative motor currents. With the use of the end stop pulses, power switches are always turned on at the ends of each PWM cycle to force any regenerative motor current to flow through the power supply and the current sense resistor thereby enables motor current amplitude detection even if the motor voltage command is then zero.

While each end stop pulse exists for a short period of time, it produces a small motor current that persists until the next end stop pulse or control pulse. Similarly, the next end stop pulse produces a small but reverse motor current that persists until the next cycle starts. Thus a small motor ripple current results from successive end stop pulses in the absence of control pulses, but the average value of the ripple current is zero so that it has essentially no effect on the current, position and velocity control of the motor.

The motor ripple current has been found to be a source of audible noise that can be very annoying to operating personnel especially at lower operating frequencies of the pulse width modulator, i.e. where higher load capacity robots are being run by the robot control. In the higher load robot applications, the ripple current also produces greater motor heating. The present invention is directed to reducing or eliminating such audible noise and such added motor heating while retaining the benefits and advantages of the pulse width modulation scheme in the referenced digital robot control prior art.

SUMMARY OF THE INVENTION

A robot comprises an arm with a plurality of joints each having an electric drive motor associated therewith. Each motor is coupled to a power amplifier including a bridge circuit with a plurality of legs each having one end thereof connected to supply drive current to the motor from a power supply connected across the bridge circuit across the other ends of the legs.

A semiconductor switch is connected in each bridge leg, and it has a control terminal to make that leg conductive when a control signal is applied to the switch control terminal. Resistance means is connected between the bridge circuit and the power supply to provide motor current sense signals for robot feedback control.

Digital control means cyclically generates time width modulated switch control pulse signals to operate the power switches and to produce motor drive current having direction and magnitude required by cyclically generated robot drive control commands. A ramp generator generates an up-and-down ramp cycle that is referenced to the robot drive control commands in controlling the modulation of the switch control signals.

The digital control means generates at one ramp end in each ramp cycle a first forced conduction switch control signal of predetermined time width for application to one of the switches in one branch of the bridge circuit while the other switch in the one branch is held conductive and thereby connects the motor across the power supply in a forward motor current flow direction at least for the predetermined forced conduction time even for a zero robot drive control command.

The digital control means further generates during the one ramp; and after the first forced conduction control signal is ended, a doublet forced conduction switch control signal substantially having the predetermined time width for application to one of the switches in another branch of the bridge circuit while the other switch in the other branch is held conductive and thereby to connect the motor across the power supply in reverse motor current flow direction at least for the predetermined forced conduction time even for a zero robot drive command. The robot drive control commands are modulated about the first forced conduction switch control signal.

DESCRIPTION OF THE PREFERRED EMBODIMENT

Figure 1:
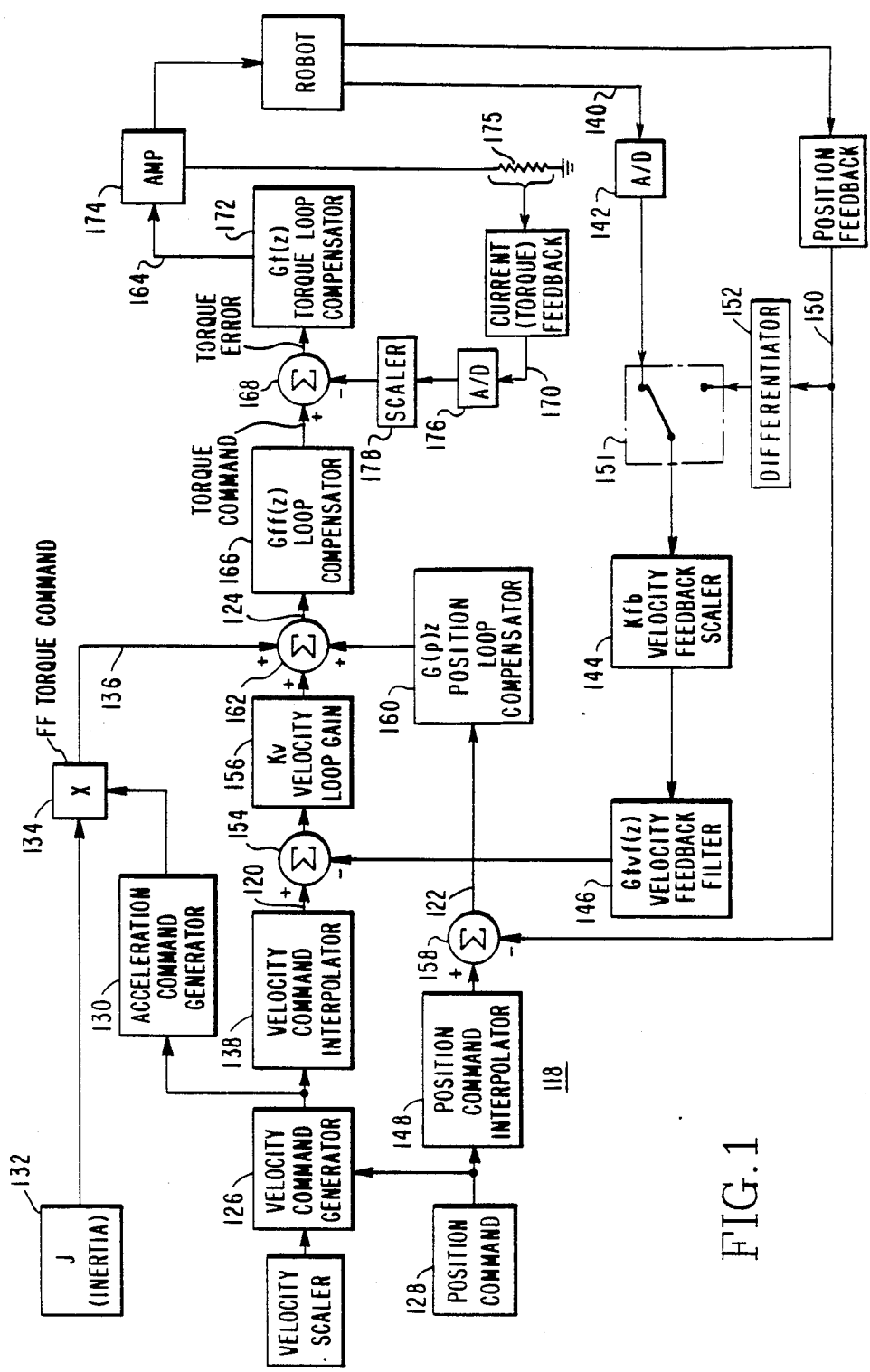
FIG. 1 shows a generalized block diagram of a control loop arrangement employing position, velocity and torque control loops in which the invention may be embodied.

In FIG. 1, there is shown a generalized control loop configuration 118 preferably employed to embody the robot control system. It is preferably implemented as a completely digital control. With the provision of hierarchical architecture and multiprocessor architecture and floating point hardware as described herein or in other patent applications referenced above, the trajectory cycle can be characterized with a cycle time in the range of 32 to 8 milliseconds depending on the employed modular configuration.

In the preferred control loop arrangement 118, position and velocity control loops 120 and 122 are parallel fed to the input of a torque control loop 124. Velocity commands are generated by block 126 from position commands received by block 128. In turn, feedforward acceleration commands are generated by block 130 from the velocity commands. Computed inertia (load and arm) 132 is multiplied against the acceleration command as indicated by reference character 134 in the feedforward acceleration control loop 136.

In the velocity loop 120, the velocity command in the present embodiment is generated once every 8 to 32 milliseconds depending on the modular configuration of the robot control. The basic robot control described subsequently herein has a trajectory cycle time of 32 milliseconds while the enhanced control has a trajectory cycle of 8 milliseconds.

In any case, a velocity interpolator 138 interpolates velocity commands at the rate of 1 each millisecond which corresponds with the velocity feedback sampling rate in velocity feedback path 140. As shown, velocity feedback for a Unimation 860 robot is produced by tachometer signals which are converted from analog to digital by converter 142. A scaler 144 and a filter 146 round out the velocity feedback circuitry.

Similarly, in the position control loop 122, an interpolator 148 generates position commands every millisecond in correspondence with the position feedback sampling rate in feedback path 150. In the Unimation 860 robot control, position feedback is absolute and the velocity and position feedback paths 140 and 150 operate as just described (with switch 151 as shown). For Unimation PUMA robots, tachometers are not available and velocity feedback is computed from incremental position feedback as indicated by block 152 (with the switch 151 swinging to its other position) as described more fully in referenced application W.E. 53,325.

Velocity error is generated by summer 154 with gain applied by loop 156. Similarly, position error is generated by summer 158 with gain applied by box 160.

Velocity and position errors and a feedforward acceleration command are summed in summer 162. Gain is applied to box 166 to generate a torque command which is applied to the input of torque control loop 164 every millisecond. Torque error is generated in summer 168 by summing the torque command (motor current command) with current feedback from feedback path 170. Box 172 applies a torque loop gain to the torque error and output commands (motor voltage commands) are applied to a power amplifier 174 which supplies the motor drive current for robot joint operation.

Current feedback from resistor 175 is generated every 250 microseconds (see referenced patent application W.E. 53,324) and converted to digital signals by box 176 with scaling applied by box 178. If desired, adaptive feedforward torque control can be employed with omission of the feedforward acceleration command as more fully described in another copending application (W.E. 53,972) entitled "Robot Control System Having Adaptive Feedforward Torque Control For Improved Accuracy", filed by E. Onaga et al. on Mar. 21, 1988.

BOARD OVERVIEW

Implementation of the control looping for the robot control is achieved by the use of digital control circuitry disposed on a plurality of electronic boards. The organization of the circuitry on the boards and the partitioning of programming among various microprocessors enables advanced robot control performance to be achieved with a modular control configuration characterized with economy of manufacture, facility and universality of use, and flexibility in choice of level of control performance.

Figure 2:
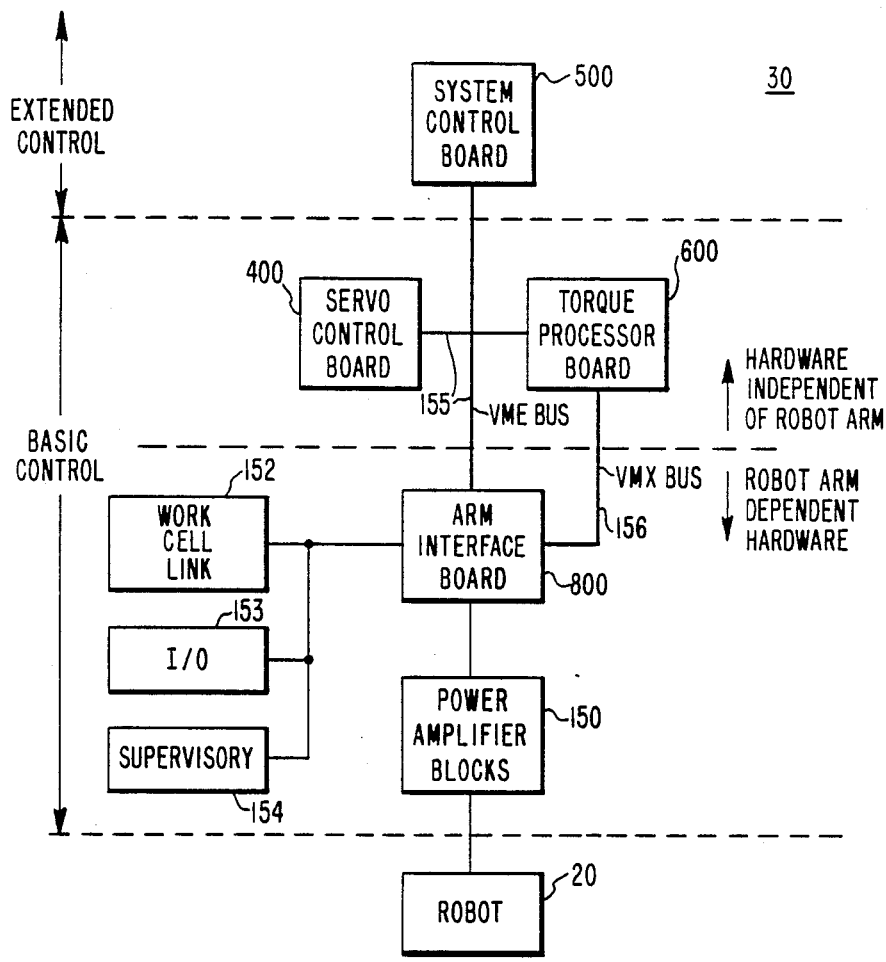
FIG. 2 shows an overview of an arrangement of electronic boards on which circuitry is arranged to implement the robot control system including the pulse width modulation circuitry of the present invention.

As shown in FIG. 2, the control board configuration or network includes an arm interface board 800 which preferably houses all circuitry dependent on the type of robot arm being controlled. For example, position feedback circuitry will differ according to whether absolute or incremental position feedback is used by the robot arm to be controlled. Thus, two or possibly more varieties of the arm interface board 800 can be employed to provide digital control systems for any of a variety of different sizes or types of robot arms. Any particular robot arm would require use of the arm interface board which is structured to work with that robot arm.

The arm interface (AIF) 800 board also houses generic circuitry such as VME bus control circuitry which is generally related to two or more boards and not to any one board in a particular system.

Control signals (pulse width modulated) are generated from the AIF board 800 to control power blocks 150 which supply motor currents to the respective robot joint motors. The AIF board 800 also operates as a channel for external coupling of the robot control 30 to other robot controls in a work cell as indicate by the reference character 152, to programmable controllers and other input/output devices 153 in an area network and to higher level computers 154 for supervisory control.

A torque processor (TP) board 600 and a servo control board 400 are generic circuit boards used with the AIF board 800 and power amplifier blocks 150 in all robot control systems for all robot types. The three circuit boards 400, 600 and 800 provide complete 6 axis control for a robot arm and thus form a basic control configuration for the UNIVAL family of robot controls.

The torque processor board 600 provides motor torque control in response to commands from the servo control board 400. In turn, the servo control board 400 provides arm solutions and position and velocity control in accordance with a robot control program.

Extended control capability and/or system functioning is achieved by interconnecting additional electronic boards or devices to the basic control 400, 600, 800. For example, with the addition of a system control board 500 and partitioning of predetermined program functions including the arm solutions from the servo control board 400 to the system control board 500, the UNIVAL control can operate the robot 20 with significantly faster control action, i.e., with a trajectory cycle shortened from thirty-two microseconds to eight microseconds.

Interboard data communications for control and other purposes occur over multiple signal paths in a VME bus 155. Additionally, a VMX bus 156 is provided for connection between the torque processor board 600 and the AIF board 800.

Multiple pin interconnectors (not shown in FIG. 2) are provided on the AIF, TP and SCM boards and any other connectable units to facilitate VME and VMX interboard bus connections modular and board assembly for the robot control 30. Other connectors are provided on the AIF board 80 for external input/output connections.

More detail on the board circuit structure is presented herein or elsewhere in the writeups for the cross-referenced patent applications.

ARM DRIVE CONTROL

As previously described, the higher level control looping generates voltage command signals to be executed through the AIF board 800 for the arm axes so that the arm effector is moved to commanded positions under controlled velocity, acceleration and torque in accordance with a user's robot program. Generally, pulse width modulation circuitry and drive circuitry are provided on the AIF board 800 to develop axis drive signals, in this instance for application to power amplifiers which provide the drive currents to DC brushless electric motors respectively associated with the six axes of robot arm motion. With the employment of pulse width modulated digital control signals, the solid state switches that control the motor currents within the power amplifiers can be operated much more efficiently to control motor current levels through pulsating on/off control as opposed to continuous amplitude control.

H BRIDGE POWER AMPLIFIER - DC BRUSH TYPE MOTORS

Figure 3:
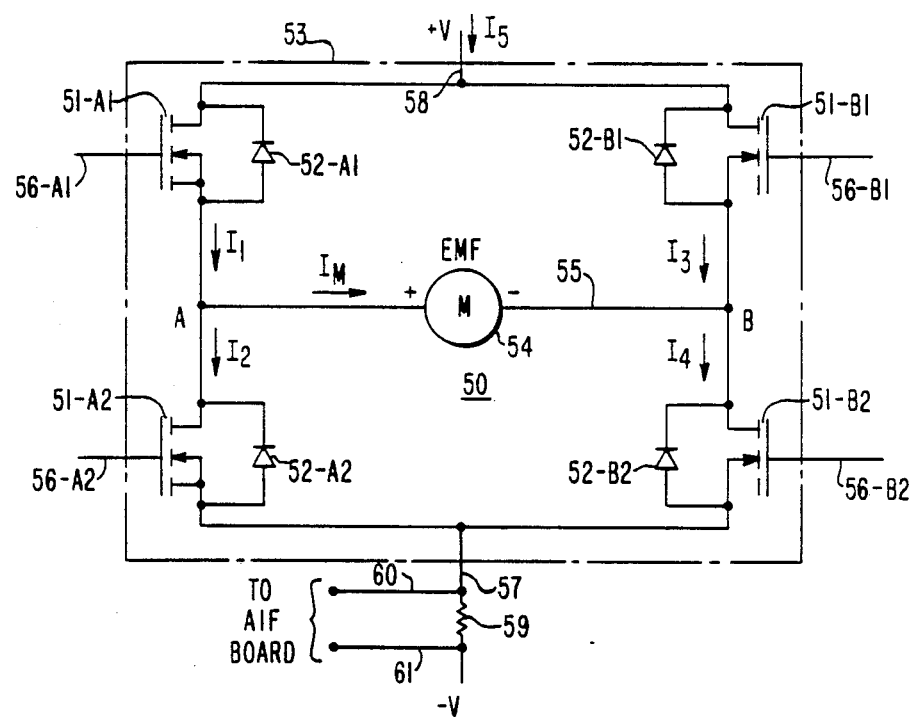
FIG. 3 shows an H bridge power amplifier circuit arranged to operate DC brush-type motors in accordance with the present invention.

An H bridge power amplifier or block 50 of the low cost hybrid type is shown in FIG. 3. One of the power blocks 50 provide motor drive current for each robot arm joint motor in DC brush type motors.

The power block 50 includes four semiconductor switches 51-A1, 51-A2, 51-B1 and 51-B2. Respective protective back voltage diodes 52 are connected across the respective semiconductor switches to permit the flow of regenerative or freewheeling currents when the switches 56-AI and 56-BI are turned off.

The switches and diodes are packaged within a block indicated by dotted line 53. As previously indicated, no internal control circuitry is included in the hybrid type power block thereby enabling flexible configuration of external controls.

A robot joint DC brush type motor 54 (representative of any of the joint motors included in the Unimation 700 series robot arm of FIG. 1) is connected in a crosspath 55 of the H bridge circuit. When switches 51-AI and 51-B2 are turned on, a positive voltage is applied across the motor 54 and current flows to the right in the crosspath 55 to drive the motor in the forward direction. With switches 51-BI and 51-A2 turned on, current flows through the crosspath 55 in the opposite direction to drive the motor in the reverse direction. The digital pulses A1 and B1 precisely control the on time of the switches 56-AI and 56-BI respectively so as to produce the motor current needed to satisfy control commands. The pulses A2 and B2 control the on time of the switches 56-A2 and 56-B2 so that the B2 and A2 on times respectively embrace the A1 and B1 on times (thereby providing closed paths for motor drive current during A1, B1 on time and circulating paths for motor freewheeling currents during A1, B1 off times) and so that the A1 and A2 switches are not on at the same time and the B1 and B2 switches are not on at the same time (to avoid shorting the power supply).

The digital pulse pairs A1, B2 and B1, A2 determine the switch on time for forward motor drive current and reverse motor drive current respectively. In turn, the switch on time determines the motor energization level, i.e., the motor torque.

Switch base leads 56 extend from the switches to the outside of the block 53 where switch drive signals A1, A2, B1 and B2 are coupled from the pulse width modulator. Power supply voltage V is connected across external supply leads 57 and 58 to provide the motor drive current. An external current sensing resistor 59 is connected in series between the lead 57 and the power supply. Conductors 60 and 61 are connected from the two resistor terminals to apply the voltage drop across the current sensing resistor to the current feedback circuitry on the AIF board 800 where it is processed for use in the current or torque control loop.

POWER AMPLIFIER FOR BRUSHLESS DC MOTORS

Figure 4A:
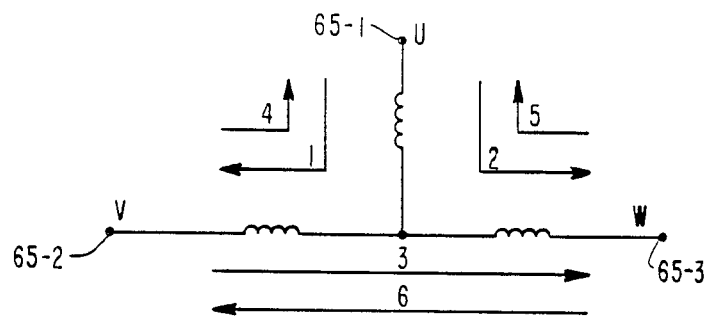
FIGS. 4A-4B show a three-phase power amplifier circuit arranged to operate brushless DC motors in accordance with another embodiment of the present invention.

In FIG. 4A, there is shown the stator winding circuitry for DC brushless motors employed as axis drives in various robots including the Unimation 860 robot.

Figure 4B:
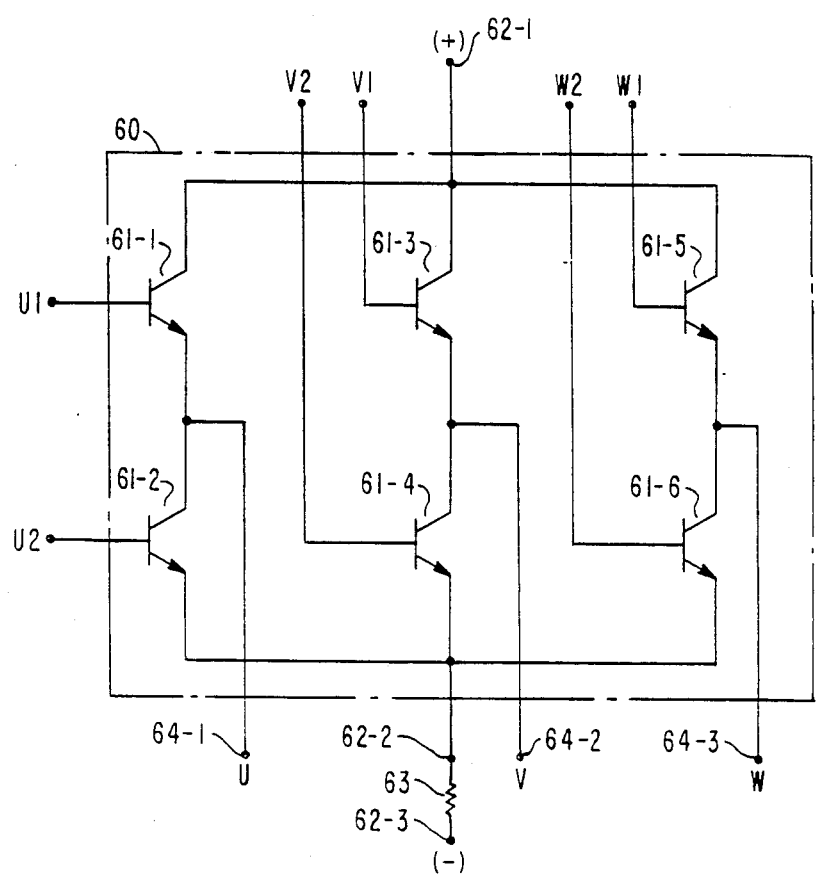

Power switch circuitry for the windings is shown in FIG. 4B. The switches are operated to direct current through two of the three windings at any one point in time, and the winding connection switching is rotated about the windings under PAL control. The effective magnitude of the motor current depends on the switch ON time which in turn is controlled by the PWM output. More detail on the generation of control pulses for the phase switches from the basic PWM switch control signals is set forth more fully in Ser. No. 932,974 entitled DIGITAL ROBOT CONTROL PROVIDING PULSE WIDTH MODULATION FOR A BRUSHLESS DC DRIVE, and filed by Kenneth E. Daggett et al. on Nov. 20, 1986.

A commercially available, low cost hybrid power amplifier block 60 (FIG. 4B) is provided for energizing the DC brushless motor windings. As indicated by the dotted box, the power amplifier block 60 is packaged to include the six semiconductor switches 61-1 through 61-6 needed for operating the three phase windings of the brushless DC motor. The block 60 is a low cost power amplifier mainly because the device is packaged to contain a simple switching circuit configuration without internal control loops.

The power amplifier block 60 is provided with external power supply terminals 62-1 and 62-2. A current sense resistor 63 is connected to the terminal 62-2 for series connection to the power supply so as to provide motor current feedback signals for control loop operation as more fully disclosed in cross-referenced patent application W.E. 53,224.

The power amplifier block 60 additionally includes external terminals 64-1, 64-2 and 64-3 for respective connection to the free ends 65-1, 65-2 and 65-3 of the Y connected motor windings. External terminals 66-1 through 66-5 are also provided for application of the switch control signals U1 and U2, V1 and V2 and W1 and W2 from PWM commutation circuitry. To prevent power supply shorting and switch burnout, the power switches are always controlled so that only one switch can be on at a time in each of the respective pairs of switches 61-1 and 61-3 and 4 and 61-5 and 6.

The control signals U1, V1 and W1 are the basic pulse width control signals that control the level of drive current through the motor windings. The control signals U2, V2 and W2 rotatively enable the six motor winding conduction paths and generally provide for the flow of freewheeling motor currents.

PULSE WIDTH MODULATION (PWM) BACKGROUND - GENERAL

Most PWM schemes use a constant frequency ramp. Generally, the PWM ramp can be generated, either with digital or analog circuitry. The PWM motor voltage request for the power amplifier bridge is represented as a value on the ramp; a zero PWM request typically corresponds to the midpoint of the ramp. Request levels above the midpoint are considered positive, and the magnitude above the midpoint determines the time that the associated power device in one leg of the power bridge is turned on. Correspondingly, request levels below the midpoint are considered negative, and the magnitude of the request level determines the time that the associated power device in the other leg of the power bridge is turned on. This type of operation is referred to as modulation around the ramp midpoint.

BETTER PRIOR ART PWM SCHEME

Measurement of the motor current is typically accomplished by insertion of current sense resistors in series with each leg of the power amplifier. The difference in voltage impressed across the sense resistors provides an indication of the magnitude and polarity of current flowing through the motor.

The only externally accessible leads provided with commercially available power blocks are the power supply rail leads. This prevents insertion of current sense resistors in series with power devices in each leg of the internally located and inaccessible bridge circuit.

Regenerative motor currents can flow through the motor without flowing through the power supply rail leads and thus would normally go undetected with a single external sense resistor. Without resolution of this problem, low cost usage of the commercially available power blocks would be precluded for robot drive applications. Thus, a better PWM scheme has been developed as set forth in W.E. 53,225 which provides accurate motor current measurement and capability for accurate, high performance closed loop motor current control based on use of a single sense resistor for current feedback measurement.

This prior art PWM scheme provides for accurate motor current measurement through use of a single current sense resistor independent of the number of legs in a power amplifier configuration. Further, it permits use of the commercially available low cost power blocks for robot control applications by switching of the power device drive signals such that motor current is forced to flow through the power supply rail leads for the power amplifier at predefined times in the PWM cycle.

Figure 5:
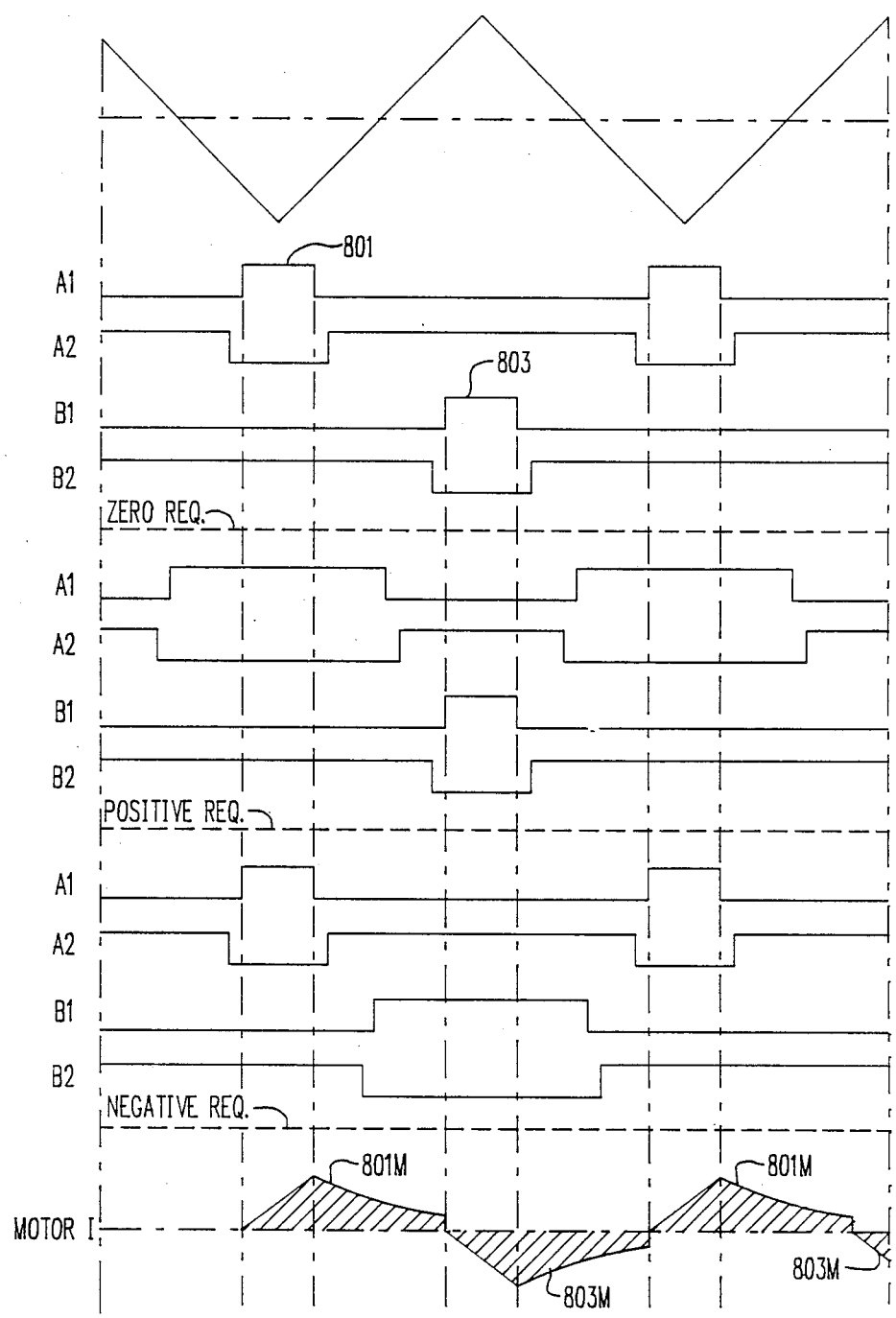
FIG. 5 is a graph showing PWM control signals generated by a prior art PWM.

The operation of the prior art PWM scheme is illustrated in FIG. 5, for zero, midpoint positive, and midpoint negative request levels. Four power amplifier drive signals are generated, two for each leg of the bridge. Positive current (a lower end stop pulse) is forced to flow through the motor with switch devices A1 and B2 turned on. In a comparable manner, negative current (an upper end stop pulse) is forced to flow through the motor with switch devices B1 and A2 turned on. A zero request is represented by the center of the lower extremity of the ramp signal.

Increasing levels of positive motor voltage request are represented by increasing values on the ramp. Switches A1 and B2 are turned on when ramp values are below the positive request level. When ramp values are above the positive request level, A1 is turned off and A2 is turned on subject to underlap timing. Under these conditions, switches A2 and B2 are turned on.

Decreasing negative request levels are represented by decreasing values on the ramp. Devices B1 and A2 are turned on for ramp values above the magnitude of the request. Ramp values below the request level, for negative request, result in device B1 being turned off and device B2 being turned on. Under these conditions, devices A2 and B2 are again turned on. As indicated, the feedback resistor is strobed periodically, i.e. at successive lower end stop timepoints, to sense the motor current then existing for feedback control.

The described prior art PWM scheme is referred to as an end stop PWM scheme since it involves modulation around the extremities of the PWM ramp cycles. These points are referred to as end stops. Modulation for positive requests occurs around the lower end stop, and modulation for negative requests occurs around the upper end stop. Power amplifier device switching is used to force opposite devices in the "H" bridge to conduct current at the PWM limits. Such switching is forced irrespective of the requested PWM polarity. Conduction is forced in the positive direction at the lower end stop and in the negative direction at the upper end stop. This methodology enables implementation of the single resistor current sensing technique.

In summary, the end stop PWM scheme permits packaged power block devices to be used since it permits an accurate representation of the motor current to be obtained at discrete points in the PWM cycle with a single current sense resistor independent of the number of legs in the power amplifier bridge circuit. The end stop PWM scheme can be used for dc-brushless and dc-brush type drives. However, as shown in FIG. 5, the motor ripple current 801M and 803M that is formed by the lower and upper end stop pulses 801 and 803 (which balance to zero current at zero motor voltage request) can cause annoying noise due to the time duration over which these current pulses decay.

PRIOR ART END STOP PWM SCHEME - IMPLEMENTATION PROBLEMS

The end stop PWM scheme was initially cost effectively implemented with semi-custom LSI circuitry. Each semi-custom LSI device provided PWM generation for three robot axes. Two LSI devices were thus required for implementation of a six axis robot controller.

With use of the end stop PWM scheme in actual drive applications, it became apparent that various modifications were required from use to use or from time to time. Modifications were initially needed to extend PWM drive signal underlap times. Changes in drive requirements also created a need for extension in drive signal related end stop timing beyond that which could be provided by the LSI PWM generation devices.

Further, especially in application of the end stop PWM scheme with high power drives, the resultant audible noise was significantly greater than that produced by conventional PWM schemes operating at the same frequency and was an annoyance to operators. Analysis of the motor currents resulting from the end stop PWM scheme indicated that the resulting ripple current was significantly higher than that produced by conventional PWM schemes for low drive currents.

Application of the referenced digital robot controller to different robot arms required changes in PWM signal timing. The equations associated with the per channel PAL devices are very complex, and, as a result, implementation of even minor changes in signal timing are difficult and time consuming. Overall, a need thus existed to develop a new and better approach for digital PWM generation.

PULSE WIDTH MODULATION SCHEME - GENERAL OVERVIEW

The pulse width modulation circuitry provides a digital interface for closing the torque or current control loop through the axis motor drive circuitry. The pulse width modulation concept is applied to control the conduction time for the joint motor power switches and thereby satisfy motor voltage and torque and other higher level commands.

Figure 6:
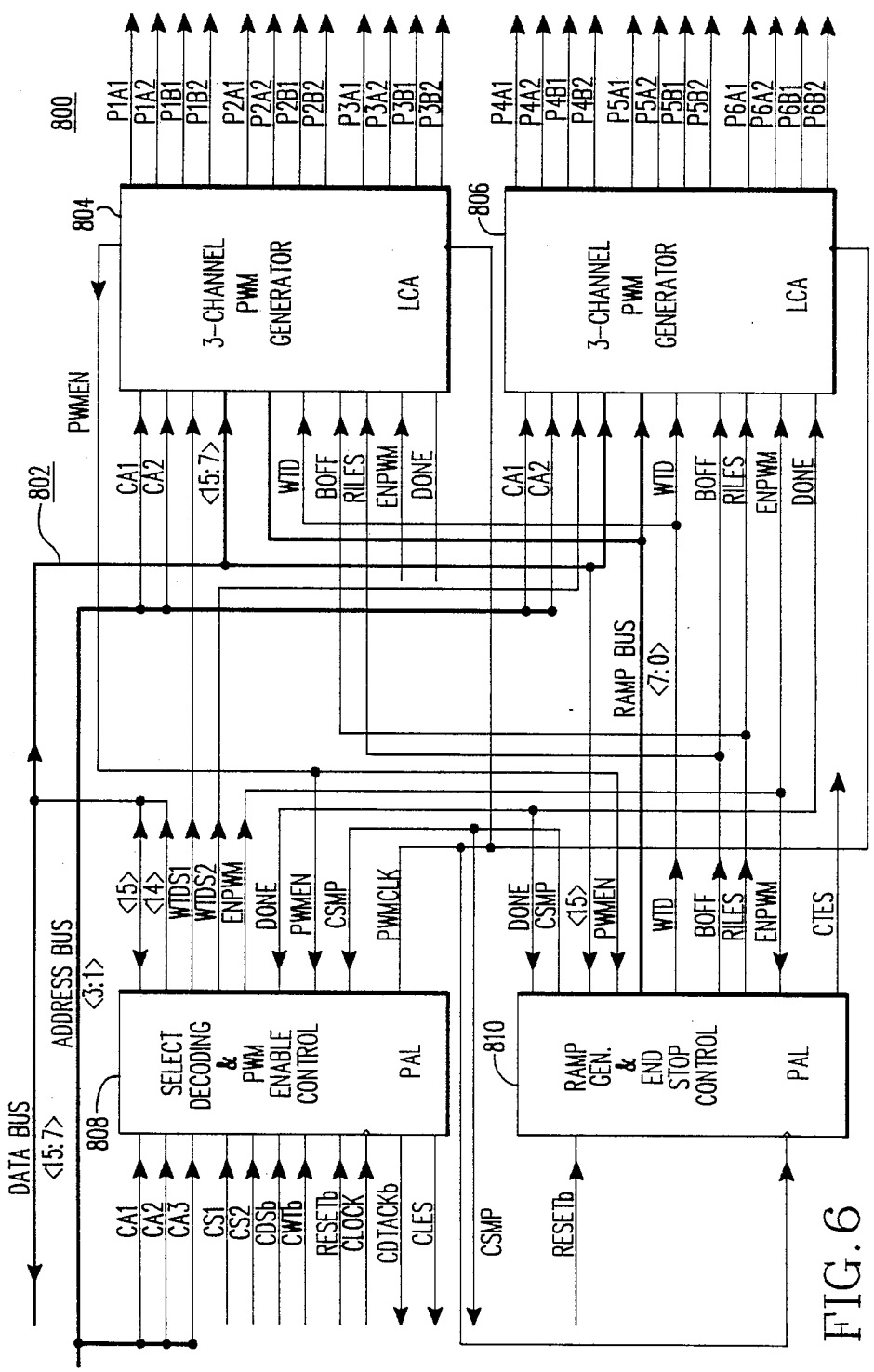
FIG. 6 shows a block diagram of a new pulse width modulation (PWM) generation subsystem which produces control signals for a power amplifier in accordance with the principles of the invention.

As shown in the generalized block diagram of FIG. 6, a digital PWM generator subsystem 802 arranged in accordance with the present invention is located on the AIF board 800 to receive 9 bit data commands and 3 register address bits from the torque microprocessor P2 bus. Additionally, device select logic, read/write, reset (initialization) and data strobe signals are received from the P2 bus. A DTACK (acknowledge) signal is returned to the bus by the PWM subsystem 802 after each command reception from the torque processor board.

The digital PWM generator subsystem 802 includes a pair of PWM generators 804 and 806 each of which is preferably arranged to service three axes where, for example, either brushless or brush type DC motors are employed as the axis drives. Thus, a set of digital signals (in this instance four such signals A1, A2, B1, B2) is generated for controlling the amplifier base or gate drive circuitry associated with each axis motor whether the motor is the brushless type or the DC brush type. A ramp generator and end stop control 808 generates a cyclic ramp and forced conduction control signals used by the PWM generator 804 and 806 in producing the digital PWM control signals and satisfying higher level commands.

As previously considered, the four digital PWM control signals control the direction and magnitude of current flow through the motor windings through on/off power switch control. In the brushless DC motor embodiment, the three phase windings of the brushless DC motor are interconnected in a bridge circuit (FIG. 4B) such that the motor drive current is always directed through a pair of windings and the motor conduction path is rotated or commutated through successive winding pairs to produce the motor drive torque. In this arrangement, the PWM pulses determine the time span of motor current flow and commutation switching logic preferably based on the PWM pulses and Hall effect sensor feedback signals determine the winding pairs through which, and the direction in which, drive current is to flow.

In the DC brush type embodiment where an H type power amplifier bridge circuit is employed, DC brush type motor 54 (FIG. 3) is operated in one direction when power amplifier switches 52-A1 and 51-B2 are opened under control of PWM output signals A1 and B2, and it is operated in the opposite direction when power amplifier switches 51-B1 and 51-B2 are opened under control of PWM output signals B1 and A2.

The three address signals generally are encoded to address registers within the PWM subsystem 802. Two registers are used to store voltage commands for each axis. A total of six registers are thus used to store voltage commands, and the remaining two registers store command and status data common to the three axes.

IMPROVED DOUBLET PWM SCHEME

A new and improved doublet PWM scheme, configured in accordance with the present invention, retains the benefits of the prior art end stop PWM scheme in that it permits use of a single resistor for measurement of the motor current. However, the new doublet scheme significantly reduces the motor ripple current to produce a significant reduction in audible noise generated. Further, the new doublet scheme is characterized with flexibility which facilitates making control system modifications, such as changes in underlap timing, as may be needed from unit to unit of robot control manufacture or from time to time for any particular unit of manufacture.

Generally, in the new and improved doublet PWM scheme, power device drive signals are switched to force motor current flow through the power supply rail leads of the power amplifier at defined points in the PWM cycle. Such points ar-e preferably centered only around the lower extremity of the PWM ramp. Further, modulation is accordingly preferably only associated with the lower extremity of the ramp, and the upper end stop switching of the prior end stop PWM scheme is eliminated.

With the new and improved doublet PWM scheme, the signal switching produced on "A" and "B" drive signals is a function of the polarity of the PWM request. A positive request results in the modulation being associated with the "A" drive signals, and, correspondingly, a negative request results in the modulation being associated with the "B" drive signals.

That is, for a positive request, the A1 drive signal is turned on for the duration of time that the PWM request level is greater than the ramp-counter value, and A1 is turned off for the duration of time that the value of the PWM request is less than the ramp counter value. For positive requests, except for forced conduction switching as considered below, the B1 drive signal is always off and the B2 drive signal is always on.

In a corresponding manner for a negative request, the B1 drive signal is turned on for the duration of time that the magnitude of the PWM request is greater than the ramp counter value, and B1 is turned off for the duration of time that the magnitude of the PWM request is less than the ramp counter value. For negative request levels, except for forced conduction switching, the A1 drive signal is always off, and the A2 drive signal is always on.

The switching action associated with the new doublet PWM scheme is significantly different from that of the prior end stop PWM scheme. For a zero PWM request level, the doublet PWM scheme, in effect, forces reverse bridge switching for zero balancing of the motor current to occur immediately following the ramp lower end stop switching.

Figure 10:
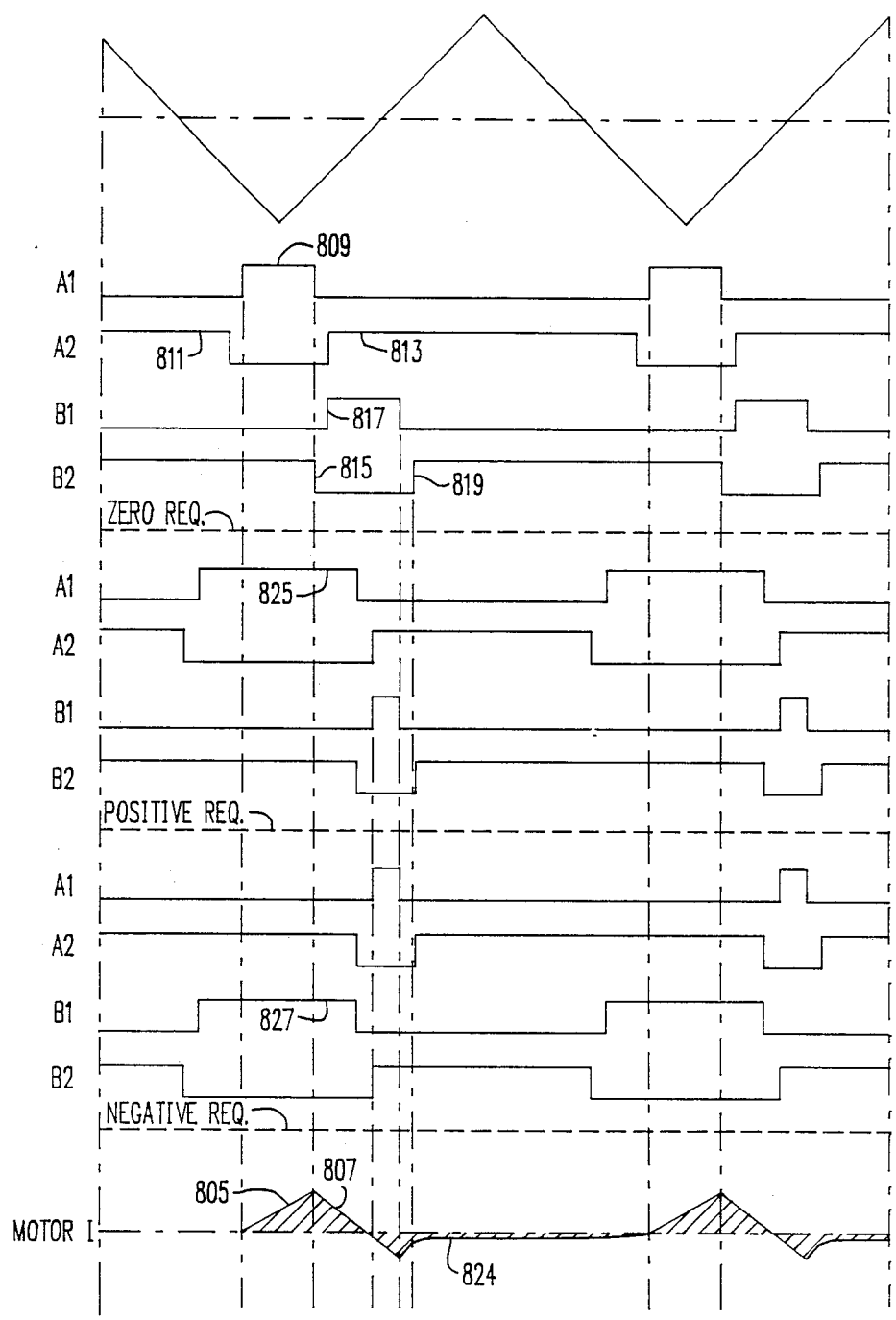
FIG. 10 is a graph illustrating the improvement achieved through operation of PWM control signals generated in accordance with the present invention.

The doublet PWM scheme is illustrated in FIG. 10. As shown, A1 and A2 signal switching 809, 811 and 813 is like that shown in FIG. 5, and as a result end stop pulse 805 is generated. To produce a "doublet" pulse, i.e. a mirror-like pulse that balances the motor current to zero under zero motor voltage command, the B2 signal is turned off preferably at the same time that the A1 signal is turned off as shown at 815. This switching is then followed after an underlap time by turning the B1 drive signal on (see 817) for the same time that the A1 drive signal has been on. Underlap timing prevents shorting of the power supply by preventing switches in the same bridge leg from being on at the same time.

Next the B2 drive signal is turned back on. As a result, current produced by forced conduction switching is actively pulled out of the motor winding in a relatively short time (pull out pulse 807) as opposed to letting it decay over the entire PWM cycle, and a very small counter-current flows on opening the B2 switch to provide zero motor current balancing. Thus, as observed by comparing the shaded areas under the ripple current waveforms in FIGS. 5 and 10, the area enclosed by the motor ripple current waveform is significantly reduced with use of the invention. This results in a significant reduction in audible noise which is proportional to the square of the area enclosed by the ripple current waveform.

Positive voltage variation is implemented by controlling the duration of the A1 pulse as indicated at 825. Negative voltage variation is based on the B1 pulse duration as indicated at 827.

With the doublet PWM scheme, modulation of the A drive signals for request values greater than zero results in the A1 drive signal being turned on for a longer time duration. This results in the B1 drive signal being turned on for a corresponding smaller duration of time. This process continues with increasing levels of request until the value of request reaches a point where B drive signal switching is not forced. From this point, for increasingly greater request values, drive signal generation is like that produced with conventional PWM schemes. Thus, with the new doublet PWM scheme, an additional advantage is realized in that a full motor voltage condition is achievable whereas full motor voltage is not achievable with the prior end stop PWM scheme because of the prior operation of the upper and lower end stop pulses.

GREATER DETAIL
AIF BOARD CIRCUITRY FOR DOUBLET PWM SCHEME

The six axis doublet PWM generation subsystem 802 preferably employs two logic configurable arrays for the PWM generators 804 and 806 (LCA) (such as Xilinx XC2064 devices) and two programmable logic arrays 808 and 810 (PALS such as Altera EP-600 devices) for the balance of the subsystem circuitry. Some description of the logic configurable array will aid in gaining an understanding of the invention as a whole.

Generally, an LCA is a gate array, i.e. a matrix of configurable logic blocks, that is soft programmable to form a desired logic configuration that processes stored data and inputs to generate outputs.

The 2064 LCA 804 or 806 specifically comprises 58 I/O pads each of which can logically be configured as either as input or an output. If a pad is configured as an output, its output driver can further be configured as either a tri-state or conventional driver. If a pad is configured as an input, it can further be configured as a direct or latched input. The interior of the LCA includes an eight by eight matrix of logic configurable blocks (LCB). Each LCB has four general purpose signal inputs, a clock signal input, and two signal outputs. Each LCB also has a storage device that can either be configured as a "D" flip-flop or as a transparent latch. Logic within each LCB can be configured to perform any single combinatorial function of four variables, or any two combinatorial function of three variables. Interconnection of the I/O pads and the LCB blocks is accomplished with the use of programmable interconnection resources within the array. All interconnections are formed by metal segments and programmable switching points are provided to implement the necessary signal routing.

The major control function associated with PWM generation involves determining when and for how long to apply a voltage to the motor. To this end, a time reference is generated and compared to a PWM request level. The output device is turned on if the time reference is less than the PWM request level and it is turned off if the time reference is greater than the PWM request level.

The doublet PWM subsystem 802 comprises the following basic functional elements which are embodied in the LCAs 804 and 806 and the PALs 808 and 810 in the PWM generation subsystem 802:

Peripheral Interface to Torque Processor Board
PWM Command Holding Register
Reference Ramp Generator
Ramp and Command Magnitude Comparator
End Stop Control Signal Generation Output Control Logic
Underlap Timer Processor peripheral circuitry within the PWM subsystem 802 includes a select decoding and PWM enable control 808 preferably in the form of the PAL device 808 noted previously, and it provides the interface of the PWM subsystem to the controlling torque manager microprocessor on the torque board 600. The interface circuitry permits the PWM subsystem 802 to appear as a microprocessor device peripheral.

The PWM command holding register holds the actual PWM command, nine bits wide, and stores the sign bit and eight magnitude bits. A separate command holding register is needed for each of the six PWM channels. The reference ramp generator is preferably embodied in another PAL device 810 and it is an eight bit up/down counter with one ramp cycle generating 512 counts. The outputs of the ramp generator and command holding register provide inputs to the magnitude comparator.

A separate magnitude comparator is embodied in each of the LCAs 804 and 806 in the respective PWM channels. The output of the magnitude comparator is a logic signal that is asserted when the command input is greater than the ramp counter value. The comparator output is a time function, and, when asserted, provides indication that an upper leg power bridge switch A1 or B1 should be on so that current is forced through the motor. Selection of the upper switch A1 or B1 is determined by the state of the sign bit stored in the holding register. Positive sign bit values force selection of A1 and negative sign bit values force selection of B1.

Forced conduction control signals RIES and BOFF are generated by the PAL device 810 to force current through the motor cyclically. The direction of motor current flow associated with the lower end stop signal RLES and the doublet signal BOFF is determined by the state of the sign bit. Assertion of RLES has the same effect as assertion of the magnitude comparator output. That is, motor current is forced to flow in the direction indicated by the sign bit to generate the lower end stop signal. Assertion of the BOFF signal forces motor current to flow opposite to the direction indicated by the sign bit to generate the doublet signal and provide ripple current noise reduction and other invention advantages as previously described.

The IP magnitude comparator output has precedence over the BOFF signal. That is, motor current is forced only for the duration of time that BOFF is asserted and the magnitude comparator output indicates that the ramp counter is less than the PWM command value. Thus, increasing values of PWM command from zero results in decreasing the time that the motor current is forced in the opposite direction, due to assertion of BOFF, until no opposite direction current flow is forced.

Two secondary control signals are also generated. One of the secondary control signals triggers cyclic sampling of the motor current, and it is asserted during the latter portion of time that RLES is asserted. The other secondary control signal is asserted midway between RLES signal assertions and provides a time reference for generation of the position and velocity loop sampling signal.

The output control logic is embodied in the LCA 804 or 806 and is used for generation of the actual logic level, power amplifier drive signals comprising A1, A2, B1 and B2 signals for each of the PWM channels. A per channel underlap timer is used in the LCA 804 or 806 to establish times during which neither A1 and A2, or B1 and B2 can be asserted. Changes in the state of either the magnitude comparator output or the forced conduction control signals force the underlap timer to be initiated. Assurance is thus provided that both switch devices in a leg of the power bridge circuit are not simultaneously conducting.

TORQUE MICROPROCESSOR INTERFACE

Figure 7:
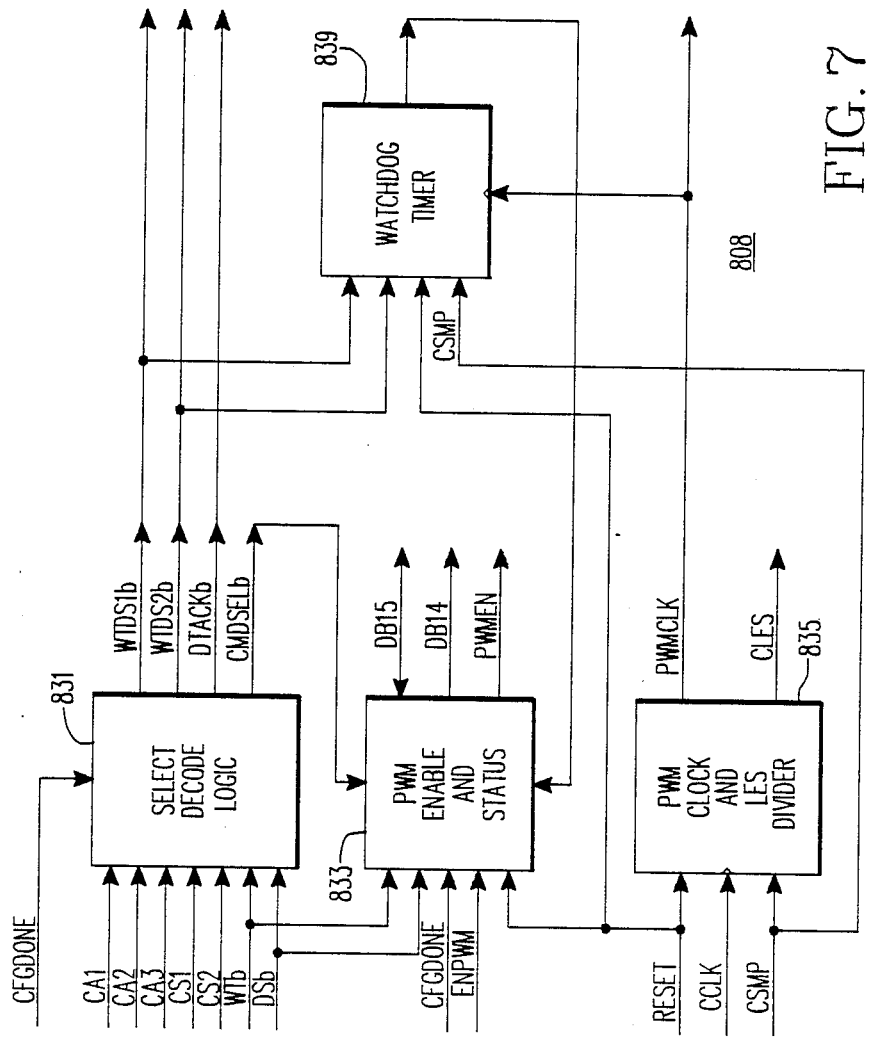
FIGS. 7, 8, and 9 show more detailed block diagrams of the PWM generation subsystem.

The select decoding and PWM enable control 808 is shown in greater block detail in FIG. 7. Device select circuitry 831 receives three address signals (CA1, CA2, and CA3), device select signals (CS1 and CS2), the write command signal, (WTb) the data strobe signal (DSb), and the Xilinx device generated configuration done signal (CFGDONE). Eight subsystem addresses are associated with each of the device select signals. Device select signal CS2 is used only during simultaneous configuration of the Xilinx devices 804 and 806.

Downloading of configuration data to the Xilinx devices 804 and 806 is accomplished by selecting CS2 subsystem address 0. A write to the subsystem, with CS2 asserted and with CA1, CA2, and CA3 being in the logical zero state, results in assertion of both Xilinx device write select strobe signals (WTDSlb and WTDS2B). Completion of the configuration operation is indicated by the configuration done signal being in the logical high state.

Device select signal CSI is associated with nonconfiguration functions. The addressing associated with this functionality is indicated in Table 1.

TABLE 1

| PWM Subsytem Address Assignments | | | | |
|---|---|---|---|---|
| CA2 | CA1 | CA0 | FUNCTION SELECTED | |
| 0 | 0 | 0 | COMMAND/STATUS | |
| 0 | 0 | 1 | PWM CHANNEL 1 | COMMAND |
| 0 | 1 | 0 | PWM CHANNEL 2 | COMMAND |
| 0 | 1 | 1 | PWM CHANNEL 3 | COMMAND |
| 1 | 0 | 1 | PWM CHANNEL 4 | COMMAND |
| 1 | 1 | 0 | PWM CHANNEL 5 | COMMAND |
| 1 | 1 | 1 | PWM CHANNEL 6 | COMMAND |

A command status register in block 833 has a single latched output bit and two status input bits. The latched output is used to generate the PWMEN signal which is connected to the master reset input of the Xilinx devices. PWMEN is in the logical 1 state during configuration. After configuration is completed, PWMEN can be non-asserted to disable PWM generation. The state of this bit is controlled by writing to the command status register. The state of data bus bit 15 is stored in this register when a write to this register is performed. This signal can also be forced to be non-asserted by watchdog timer circuitry 839.

The states of two status signals are input to block 833 on data bits 15 and 14 when a read operation is performed on the command status port. The state of data bit 15 reflects the state of the configuration done signal (CFGDONE), and the state of data bit 14 reflects the state of the ENPWM signal when a status port read operation is performed. The ENPWM signal is derived from one of the Xilinx devices. This signal is clocked to a logical one on the first positive PWM clock signal translation after configuration has been completed and reset to the device, as indicated by the PWMEN signal, has become non-asserted.

The watchdog timer 839 is included within the PWM subsystem 802 for safety purposes. The timer 839 causes the PWM to be disabled automatically if any of the PWM command registers are not written within three consecutive positive transitions of the CSMP signal. The timer 839 is implemented as a divide by four counter, and the counter is advanced one count with every positive transition of the CSMP signal. Watchdog error condition is indicated if the timer reaches a count of three. When the counter reaches the error state, the ENPWM signal becomes non-asserted. Timer reset is performed by writing to any of the PWM command holding registers.

Remaining circuitry associated with the microprocessor peripheral interface in block 835 is associated with generation of the actual PWM clock. The clock circuitry, for compatibility with other versions of the PWM subsystem, divides the input clock signal by two. In addition, the CSMP signal is inverted to provide the equivalent of the CLES signal.

RAMP COUNTER AND END STOP AND DOUBLET CONTROL

Figure 8:
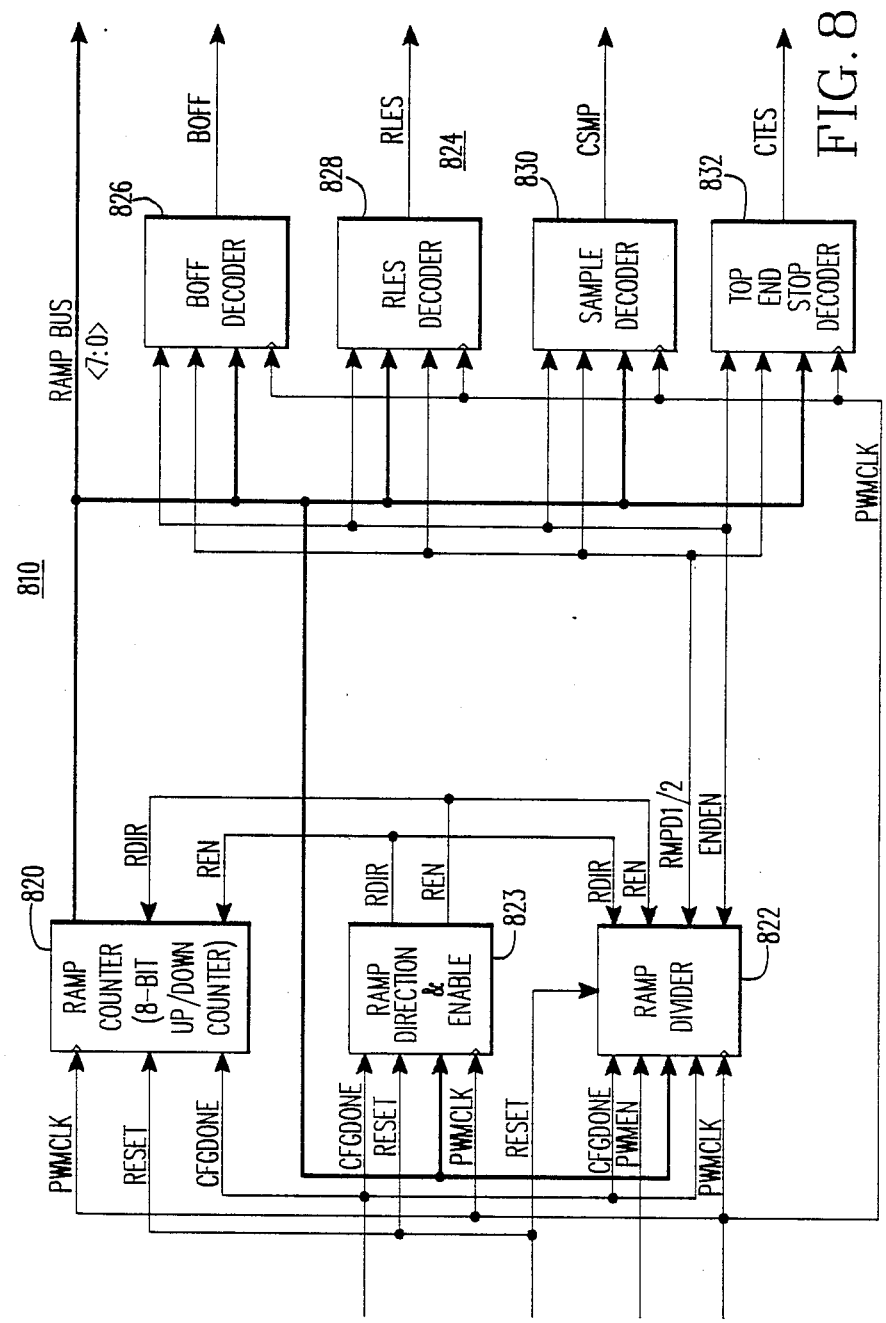

The ramp counter and end stop control circuitry is illustrated in greater block detail in FIG. 8. The ramp counter is implemented as an eight bit up/down binary counter 820. Direction of counting is determined by the state of signal RDIR. When RDIR is in the logical zero state, the counter 820 is forced to be incremented with every positive transition of the PWMCLK signal. Conversely, when RDIR is in the logical one state, the counter 820 is forced to be decremented with every positive transition of the PWMCLK signal.

The ramp counter 820 also receives from block 823 a count enable signal, REN, which is non-asserted during configuration of the Xilinx devices 804 and 806. After configuration is completed, the signal REN becomes non-asserted for one counter cycle during the time that counting direction is changed. Disabling of counting for one clock cycle is needed to force a ramp cycle to have exactly 512 counts.

Ramp divider circuitry 822 allows lower end stop and doublet signals to be generated at a sub-ramp frequency. This permits PWM generation to be performed at a higher frequency than the current loop is sampled. Capability is provided for dividing PWM ramp cycles by four.

PWM forced conduction control 824 employs blocks 826, 828, 830 and 832 to generate four control signals RLES, BOFF, CSMP, and CTES. These signals are generator by combinatorial decoding of the ramp counter and ramp divider signals and generation may be performed at any point in the ramp cycle.

Two of the signals, RLES and BOFF are input to the Xilinx devices 804 and 806 as previously indicated, and are used to force predetermined switching of the PWM output signals. The control signal CSMP is used as a control signal to strobe the current feedback A/D converter sample-and-hold circuits, and for this purpose is asserted during the latter portion of the RLES assertion. The length of time that both RLES and CSMP are asserted is dependent on the characteristics of the power amplifier and actual motors used in the robot. The CTES signal provides a time reference for the remainder of the control system, and is used as a basis for determination of the main robot control system sampling frequency.

LOGIC CONFIGURABLE ARRAYS

Figure 9:
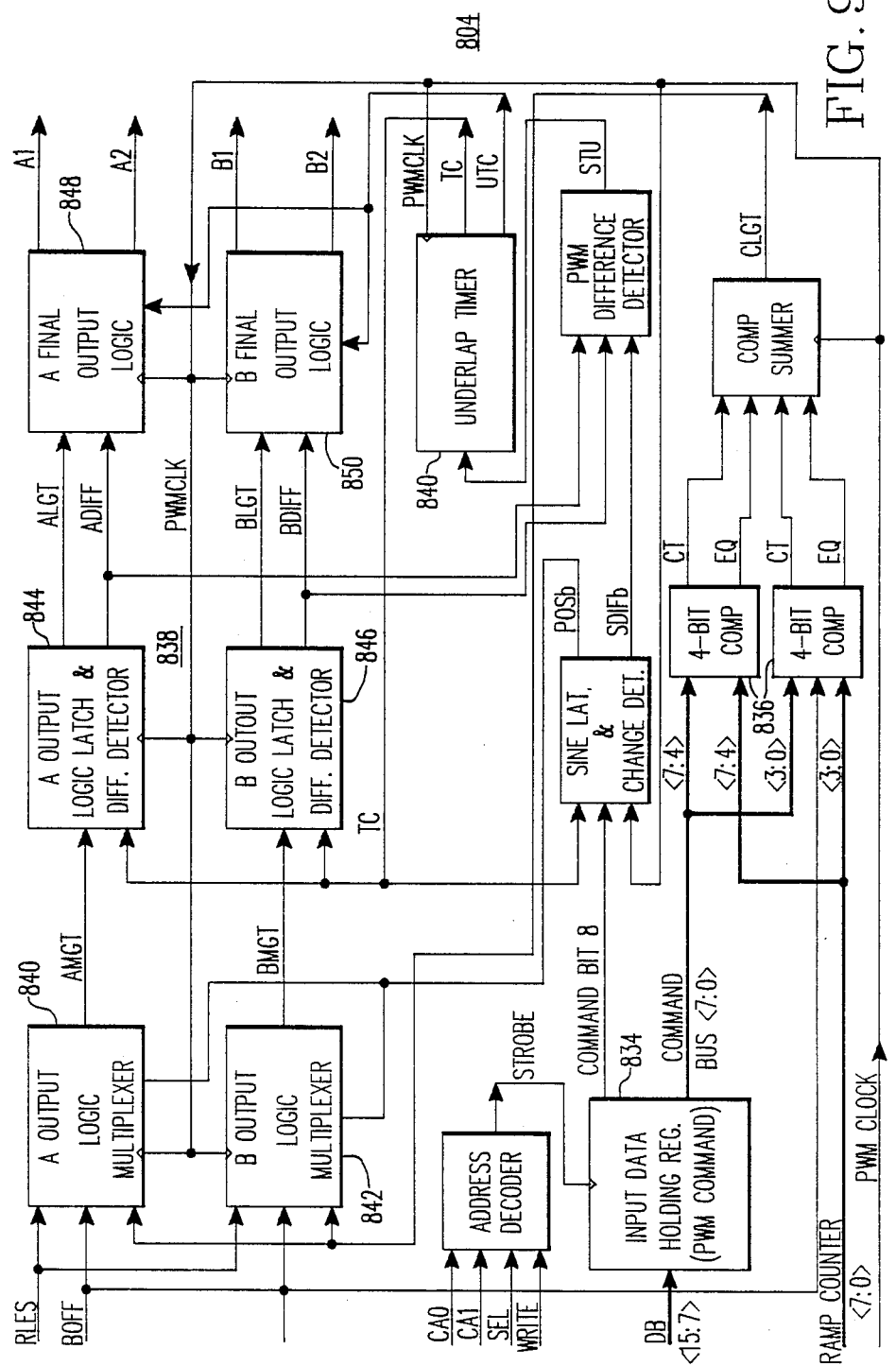

A single channel of PWM generation functions is shown in FIG. 9 as preferably embodied in an LCA device 804 or 806 to provide better unit flexibility in design and use in accordance with the invention. A nine bit holding register 834, an eight bit comparator 836, output control logic 838, and underlap timer 840 are included. The nine bit holding register 834 is used for storage of the PWM request. The outputs of the holding register 834 and the PWM ramp signals provide the inputs to the eight bit comparator 836.

The comparator 836 is implemented with use of a ripple carry technique. Thus, the eight bit comparator 836 is physically implemented as two four bit comparators. The equal and greater than outputs of the two four bit comparators are input to a logic stage which generates the final comparator output signal. This methodology conserves logic within the LCA device and reduces signal propagation delays.

The output control logic 838 is divided into three groups: "A" drive logic, "B" drive logic, and common output control logic. The "A" and "B" drive logic groups are identical in functionality, with the exception of sign bit association.

Three logic configurable blocks are associated with the generation of each set of A1, A2 or B1, B2 drive signals. A first logic configurable block, 840 or 842, receives the magnitude comparator output, the final latched sign bit signal, and the lower end stop and doublet control signals, and multiplexes these signals, according to the state of the sign bit, to produce logic signal, AMGT or BMGT to indicate that the "H Bridge" leg upper power device should be turned on. This signal with a terminal count signal from the underlap timer (TC) provide input to the next logic configurable block 844 or 846.

Two output signals are generated by the logic block 844 or 846. One signal, ADIFF or BDIFF, indicates that a drive signal change in state is required. The ADIFF or BDIFF signal also provides an input to the difference detector logic to start the underlap timer. The other output signal ALGT or BLGT generated by the logic block 844 or 846 is a latched representation of the AMGT or BMGT signal, with the exception that it is only allowed to change state when the underlap timer terminal counter signal TC is asserted.

The signals ADIFF and ALGT or BDIFF and BLGT, along with a signal UTC (indicating that the underlap timer counter is active) are input to the final A or B drive group logic configurable block 848 or 850. The ALGT or BLGT signal is latched within the block, and the output of the latch directly determines the logic state of the A1 or B1 drive signal.

The A2 or B2 drive signal is derived from combinatorial logic implemented within the block. When ADIFF or BDIFF is asserted, both output drive signals A1, A2 or B1, B2 are forced to the non-asserted state for the duration of time that the underlap timer is active, indicated by UTC being asserted. At all other times, the state of ALGT or BLGT directly determines the state of A1, A2 or B1, B2. With signal ALGT or BLGT asserted, A1 or B1 is asserted and A2 or B2 is non-asserted. Conversely, with signal ALGT or BLGT non-asserted, A1 or B1 is non-asserted and signal A2 or B2 is asserted.

The remaining logic implemented within each LCA device is associated with functions common to the three channels of PWM generation. The least significant two subsystem address signal lines are provided as inputs to each LCA device 804 or 806. These two signals along with the device specific write select signal is decoded within each device to generate internally the individual (not shown) PWM channel holding register strobe signals.

A single flip-flop (not shown) within each device is dedicated for indication that the device has been configured, and that the master reset signal is non-asserted. The output PWMEN of the configuration states flip-flop is connected to a device output pin that is logically held low during configuration. Thus, this pin remains in the low state from application of power until the device has been configured and the master reset has become non-asserted. PWMEN is input to the ramp divider 822 in the ramp generator circuitry, and logic implemented within the ramp generator only permits assertion of the PWM end stop and doublet control signals RLES and BOFF when PWMEN is in the logical high state.

PWM SUBSYSTEM OPERATION

With the doublet PWM scheme, PWM command data is supplied to the LCA devices 804 and 806 in a sign plus magnitude representation. The most significant data bit, DB15, represents the sign bit. A logical zero sign bit indicates a positive PWM command request, and a logical high sign bit indicates a negative PWM command request. The remaining eight data bits present the magnitude of the PWM request. Data bit 14 represents the most significant magnitude data bit and data bit 7 represents the least significant magnitude data bit.

Torque loop execution software uses a two's complement representation of data in calculating PWM command request. A lookup resident within the torque processor TMS-32010 program memory space is used for conversion from two's complement to sign plus magnitude data representation. This lookup table is also used to linearize the PWM command request and motor current relationship.

Linearization of the PWM request is required for two reasons, both of which are related to forced conduction switching. Forced conduction switching involves two distinct time elements, composed of the RLES and BOFF pulse widths. Forced end stop switching associated with RLES produces a "dead band" in the PWM command request/motor current relationship. RLES end stop switching necessary for current sensing can be viewed as a given magnitude of PWM command request.

The actual magnitude of PWM command request represented by this "end stop request magnitude" is equal to one-half the RLES end stop pulse width. Since the average motor current due to combined RLES and BOFF end stop switching is zero, no additional motor current is forced until the PWM command request level exceeds the equivalent RLES end stop command request level.

An additional non-linear effect is produced due to modulation during BOFF time. As the PWM command request magnitude is increased, after the equivalent dead band magnitude is exceeded, the time that motor current is forced increases, and the time that reverse current is forced decreases, until the magnitude of PWM command request exceeds a request level equivalent to the combined one half RLES and BOFF time. Request levels above this equivalent command level result in a linear request/motor current relationship. The torque processor PWM lookup table is also used to provide the basis for removing the dead band effect and for establishing the necessary compensation so that a near linear relationship exist between command request level and motor current for the entire PWM generation range.

Current measurement with the doublet PWM scheme is also different from that of the original UNIVAL PWM scheme. The benefits associated with usage of a single current sense resistor have been retained. However, modulation around the same ramp point for both positive and negative PWM request, forces the relationship between polarity of sense resistor voltage and the polarity of motor current to be a function of the polarity of PWM request. Positive command request result in the RLES pulse forcing devices A1 and B2 to be turned on. This state of drive switches results in a relationship such that a positive voltage impressed across the current sense resistor is representative of positive motor current. Conversely, a negative voltage impressed across the current sense resistor is representative of negative, or regenerative, motor current. Thus, for positive PWM command request, the relationship between current sense resistor voltage polarity and motor current is identical to that for the original UNIVAL PWM scheme.

The difference in motor current and sense resistor voltage polarity occurs with negative polarity of PWM command request. A negative PWM command request results in the RLES pulse forcing devices B1 and A2 to be turned on. This state of drive switches results in a relationship such that a positive voltage impressed across the current sense resistor is representative of negative motor current, and conversely a negative voltage impressed across the current sense resistor is representative of positive, or regenerative motor current. Thus, for a negative PWM command request, the relationship between current sense resistor voltage polarity and motor current is opposite to that for the original UNIVAL PWM scheme. Interpretation of actual motor current therefore is performed as a function of PWM command request polarity, and this interpretation is appropriately accomplished in the torque processor software.

What is claimed is:

1. A system for energizing a robot arm joint motor comprising:
   a power amplifier including a bridge circuit with a plurality of legs each having one end thereof connected to supply drive current to the motor from a power supply connected across said bridge circuit across the other ends of said legs;
   a semiconductor switch connected in each bridge leg and having a control terminal to make that leg conductive when a control signal is applied to said switch control terminal;
   resistance means connected between said bridge circuit and the power supply to provide motor current sense signals for robot feedback control;
   digital control means for cyclically generating time width modulated switch control pulse signals to operate said semiconductor switches and produce motor drive current having direction and magnitude required by cyclically generated robot drive control commands;

said digital control means including a ramp generator for generating an up and down ramp cycle that is referenced to the robot drive control commands in controlling the modulation of said switch control signals;

means for operating said digital control means to generate at one ramp end in each ramp cycle a first forced conduction switch control signal of predetermined time width for application to one of the switches in one branch of the bridge circuit while the other switch in said one branch is held conductive and thereby to connect the motor across the power supply in a forward motor current flow direction at least for the predetermined forced conduction time even for a zero robot drive control command;

means for operating said digital control means to generate during said one ramp, and after said first forced conduction control signal is ended, a doublet forced conduction switch control signal substantially having said predetermined time width for application to one of the switches in another branch of the bridge circuit while the other switch in said other branch is held conductive and thereby to connect the motor across the power supply in reverse motor current flow direction at least for the predetermined forced conduction time even for a zero robot drive command; and means for operating said digital control means to modulate the robot drive control commands about said first forced conduction switch control signal.

2. An energizing system for a robot arm joint motor as set forth in claim 1 wherein said doublet control signal is started when said first control signal is ended.

3. An energizing system for a robot arm joint motor as set forth in claim 1 wherein at least one logic configurable array device is employed in said digital control means to generate said switch control signals in response to comparisons between received robot drive commands and the up and down ramp cycle in accordance with predetermined logic.

4. An energizing system as set forth in claim 1 wherein at least one programmable array logic device is employed in said digital control means to generate said up and down ramp cycle.

5. A robot comprising:

an arm with a plurality of joints;

each of said joints having an electric drive motor associated therewith;

each of said motors coupled to a power amplifier including a bridge circuit with a plurality of legs each having one end thereof connected to supply drive current to the motor from a power supply connected across said bridge circuit across the other ends of said legs;

a semiconductor switch connected in each bridge leg and having a control terminal to make that leg conductive when a control signal is applied to said switch control terminal;

resistance means connected between said bridge circuit and the power supply to provide motor current sense signals for robot feedback control;

digital control means for cyclically generating time width modules control pulse signals to operate said semiconductor switches and produce motor drive current having direction and magnitude required by cyclically generated robot drive control commands;

said digital control means including a ramp generator for generating an up and down ramp cycle that is referenced to the robot drive control commands in controlling the modulation of said switch control signals;

means for operating said digital control means to generate at one ramp end in each ramp cycle a first forced conduction switch control signal of predetermined time width for application to one of the switches in one branch of the bridge circuit while the other switch in said one branch is held conductive and thereby to connect the motor across the power supply in a forward motor current flow direction at least for the predetermined forced conduction time even for a zero robot drive control command;

means for operating said digital control means to generate during said one ramp, and after said first forced conduction control signal is ended, a doublet forced conduction switch control signal substantially having said predetermined time width for application to one of the switches in another branch of the bridge circuit while the other switch in said other branch is held conductive and thereby to connect the motor across the power supply in reverse motor current flow direction at least for the predetermined forced conduction time even for a zero robot drive command; and means for operating said digital control means to modulate the robot drive control commands about said first forced conduction switch control signal.

6. A robot as set forth in claim 5 wherein said doublet control signal is started when said first control signal is ended.

7. A robot as set forth in claim 5 wherein at least one logic configurable array is employed in said digital control means to generate said switch control signals in response to comparisons between received robot drive commands and the up and down ramp cycle in accordance with predetermined logic.

8. A robot as set forth in claim 5 wherein at least one programmable array logic dice is employed in said digital control means to generate said up and down ramp cycle.

* * * * *

UNITED STATES PATENT AND TRADEMARK OFFICE
CERTIFICATE OF CORRECTION

PATENT NO. : 4,980,838

DATED : December 25, 1990

INVENTOR(S) : Daggett et al.

It is certified that error appears in the above-identified patent and that said Letters Patent is hereby corrected as shown below:

Column 5, line 45, "80" should read --800--.

Column 6, line 13, "AI" should read --A1--.

Column 6, line 13, "BI" should read --B1--.

Column 6, line 22, "AI" should read --A1--.

Column 6, line 26, "BI" should read --B1--.

Column 6, line 30, "AI" should read --A1--.

Column 6, line 30, "BI" should read --B1--.

Column 10, line 36, "AI" should read --A1--.

Column 10, line 39, "BI" should read --B1--.

Column 10, line 66, "ar-e" should read --are--.

UNITED STATES PATENT AND TRADEMARK OFFICE
CERTIFICATE OF CORRECTION

PATENT NO. : 4,980,838

DATED : December 35, 1990

INVENTOR(S) : Daggett et al.

It is certified that error appears in the above-identified patent and that said Letters Patent is hereby corrected as shown below:

Column 13, line 33, "RIES" should read --RLES--.

Column 14, line 30, "CSI" should read --CS1--.

Column 18, line 57, "control .terminal" should read --control terminal--.

Claim 5, column 20, line 7 "modules control" should read --modulated switch control--.

Claim 8, column 20, line 54 "dice" should be --device--.

Signed and Sealed this

Twenty-first Day of April, 1992

Attest:

HARRY F. MANBECK, JR.

*Attesting Officer*   Commissioner of Patents and Trademarks